United States Patent
Kim

(10) Patent No.: US 7,315,565 B2
(45) Date of Patent: Jan. 1, 2008

(54) SYSTEM FOR, AND METHOD OF, PROVIDING FREQUENCY HOPPING

(75) Inventor: Young M. Kim, Los Angeles, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 0 days.

(21) Appl. No.: 11/286,468

(22) Filed: Jan. 23, 2006

(65) Prior Publication Data

US 2006/0109889 A1    May 25, 2006

Related U.S. Application Data

(63) Continuation of application No. 09/569,402, filed on May 12, 2000.

(51) Int. Cl.
*H04B 1/00* (2006.01)
(52) U.S. Cl. .................................................. 375/132
(58) Field of Classification Search ................ 375/132, 375/130, 295, 316, 334, 335, 346, 296; 334/18, 334/17, 29; 340/825, 2.1, 2.2, 870.18, 870.01; 370/437, 431, 464, 204, 203; 455/62, 39, 455/63.1, 63.3; 332/106
See application file for complete search history.

(56) References Cited

U.S. PATENT DOCUMENTS

| 4,715,046 A | 12/1987 | True et al. |
| 5,394,433 A | 2/1995 | Bantz et al. |
| 5,541,954 A | 7/1996 | Emi |
| 5,809,059 A | 9/1998 | Souissi et al. |
| 6,223,053 B1 | 4/2001 | Friedmann et al. |
| 6,952,439 B1 * | 10/2005 | Lindsey et al. ............. 375/140 |
| 7,050,479 B1 * | 5/2006 | Kim ........................... 375/132 |

* cited by examiner

*Primary Examiner*—Pankaj Kumar
(74) *Attorney, Agent, or Firm*—Fulwider Patton LLP

(57) ABSTRACT

In many systems now in use for sending digital data from a controlled station (e.g., a transmitting station), generally indicated at 10 in FIG. 1, to a controlling station (e.g., a receiving station) generally indicated at 12, a plurality of hopping frequencies are provided. In such systems, a first packet is transmitted from the controlled station 10 to the controlling station 12 at a first one of the hopping frequencies in the plurality. The data in a second one of the packets is then transmitted from the controlled station 10 to the controlling station 12 at a second one of the hopping frequencies. The data in a third one of the packets is subsequently transmitted from the controlled station 10 to the controlling station 12 at a third one of the hopping frequencies. The sequence of the different hopping frequencies for use as the carrier for the transmission of the successive data packets from the controlled station 10 to the controlling station 12 is known to the controlled station and the controlling station. By providing a sequence of different hopping frequencies for the transmission of successive data packets from the controlled station 10 to the controlling station, the controlling station 12 is able to differentiate the data packets, transmitted to it through a communication channel or by wireless, from a vast number of other data packets which are transmitted from other controlled stations to other controlling stations.

41 Claims, 6 Drawing Sheets

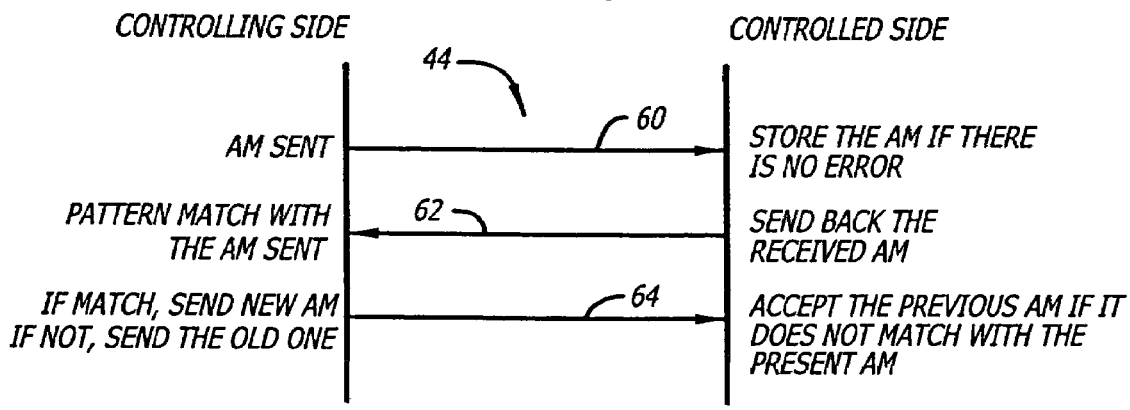
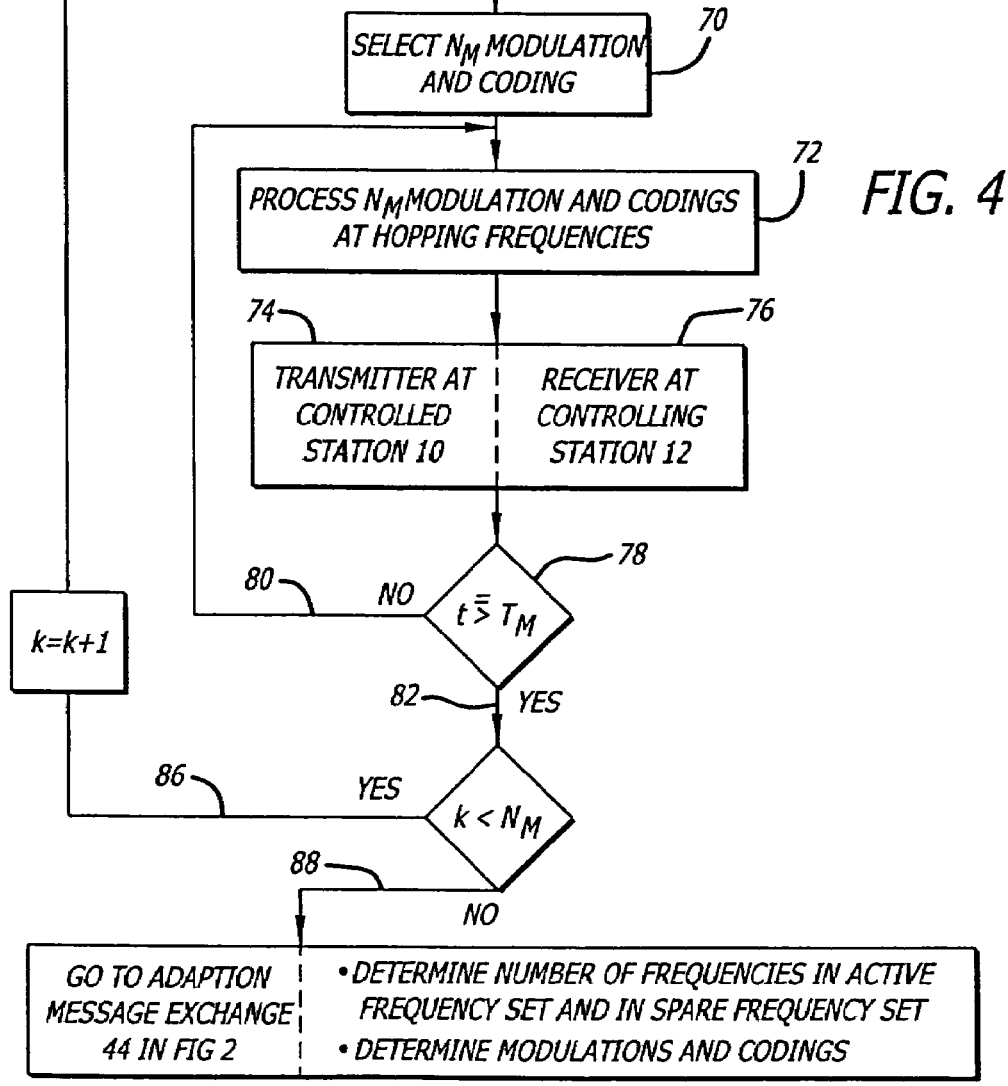

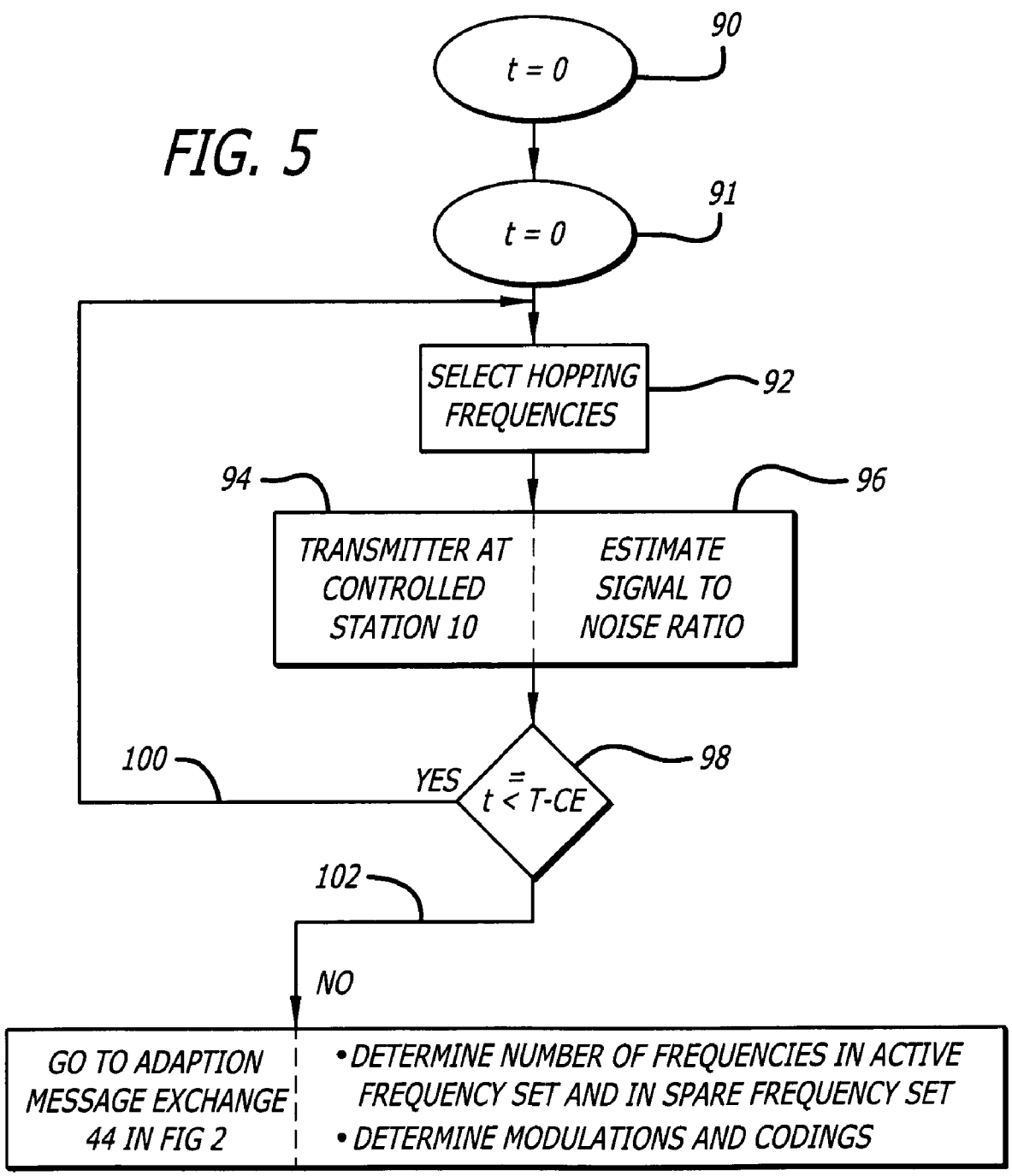

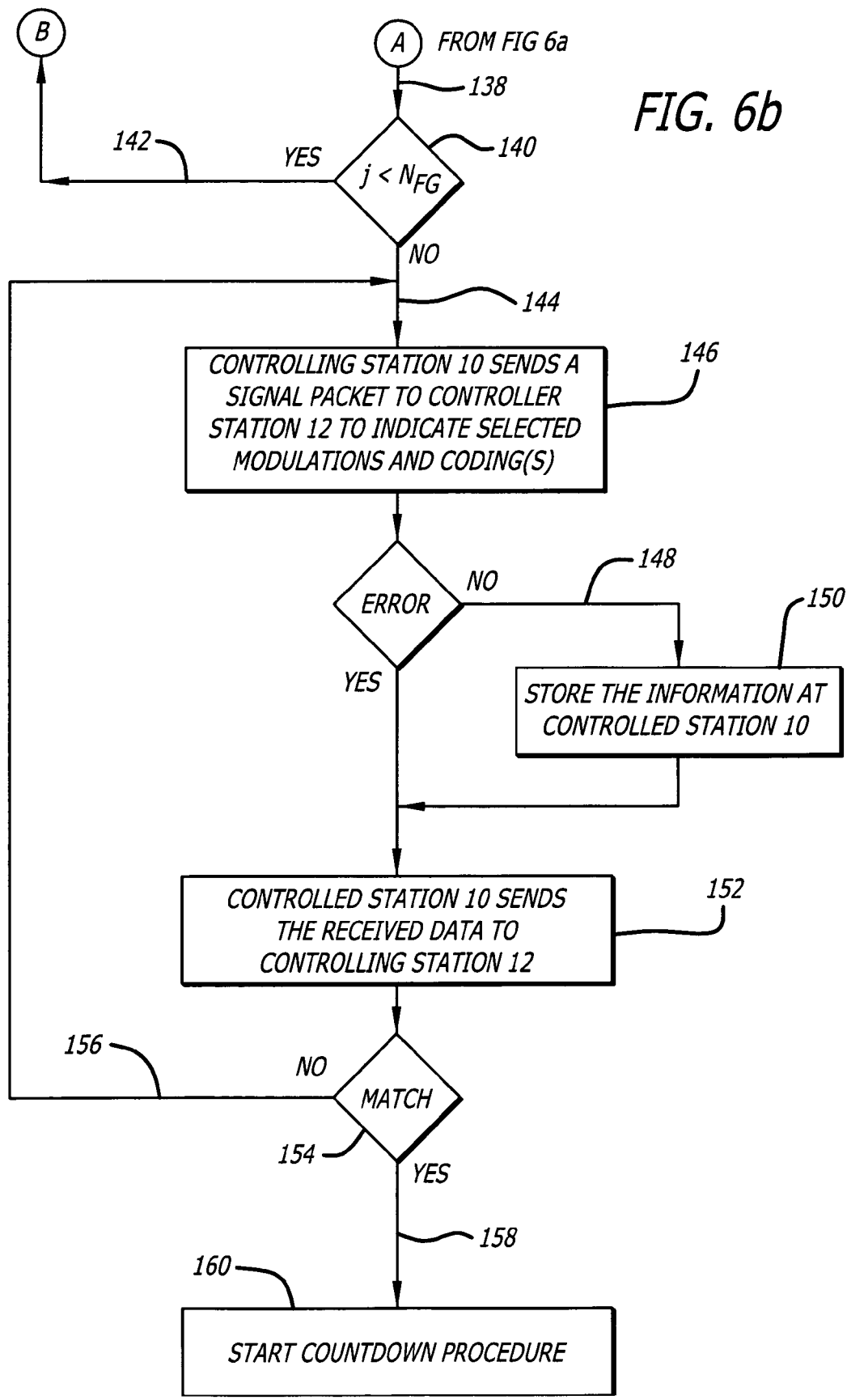

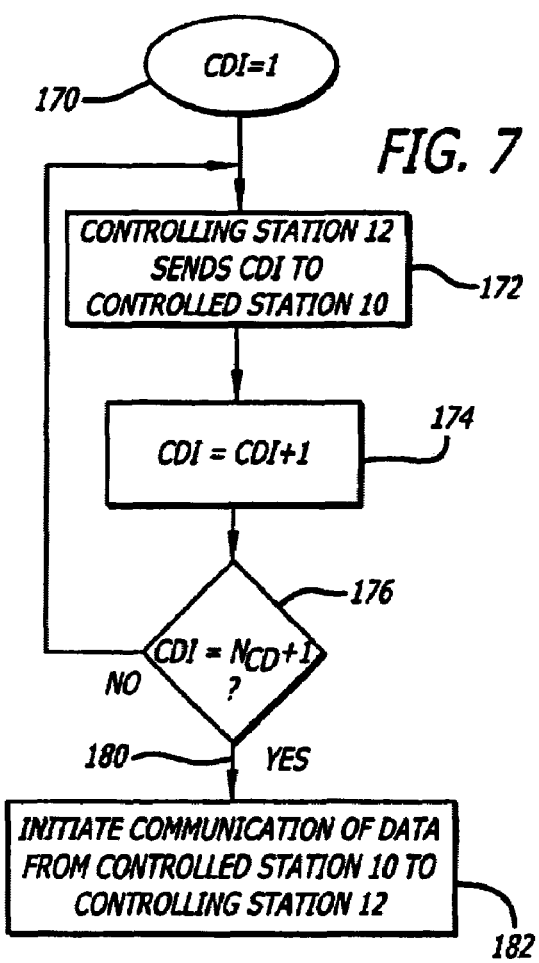
FIG. 7
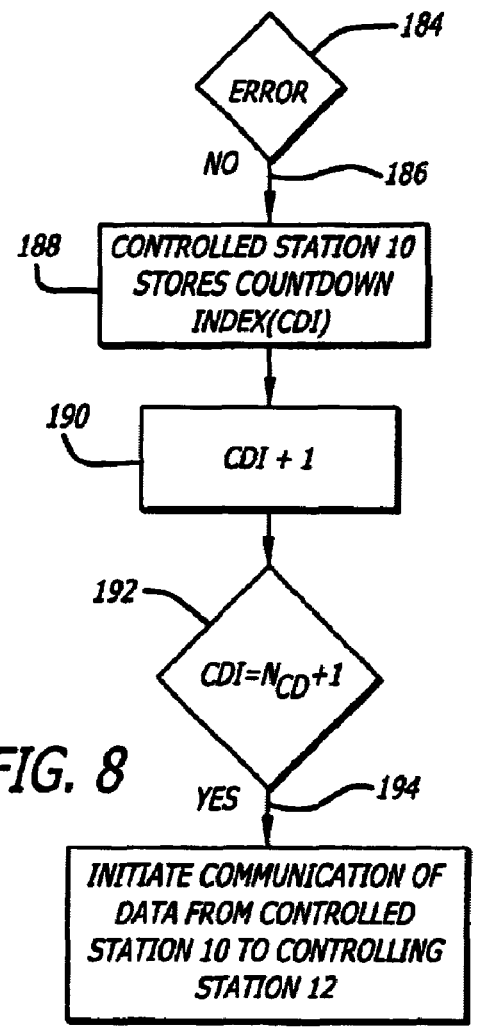
FIG. 8
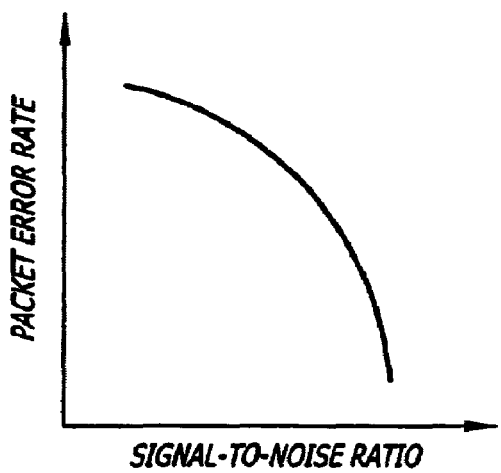
FIG. 9
00 ←→ 0123
01 ←→ 0231
10 ←→ 0213
11 ←→ 0321
FIG. 10

SYSTEM FOR, AND METHOD OF, PROVIDING FREQUENCY HOPPING

CROSS-REFERENCE TO RELATED APPLICATION

This application is a continuation of U.S. Ser. No. 09/569,402, filed May 12, 2000, the contents of which are hereby incorporated herein by reference.

BACKGROUND OF THE INVENTION

BRIEF DESCRIPTION OF THE DRAWINGS

In the drawings:

FIG. 3 is a flow chart schematically indicating how the controlled station learns from the controlling station the selected hopping frequencies and the modulation(s) and coding(s) to be used in transmitting data from the controlled station to the controlling station;

FIG. 4 is a flow chart schematically showing an arrangement of how optimal hopping frequencies and an optimal modulation and coding are selected to transmit data from the controlled station to the controlling station;

FIG. 5 is a flow chart schematically showing an alternate arrangement of how optimal hopping frequencies are selected to transmit data from the controlled station to the controlling station;

FIGS. 6a and 6b are flow charts which indicate the sequence of operations for transmitting, from the controlling station to the controlled station, information determined by the controlling station and relating to active hopping frequencies used in the transmission of data from the controlled station to the controlling station and relating to the modulation(s) and coding(s) of the data in each data transmission;

FIG. 7 is a flow chart indicating the sequence of operations of the controlling station for synchronizing the operations of the controlling station and the controlled station after the completion of the operations in the flow charts shown in FIG. 6 but before a communication of data from the controlled station to the controlling station is instituted;

FIG. 8 is a flow chart indicating the sequence of operations of the controlled station for synchronizing the operations of the controlling station and the controlled station after the completion of the operations in the flow chart shown in FIG. 6 but before a communication of data from the controlled station to the controlling station is initiated.

FIG. 9 is a curve which indicates the ratio of signal to noise and interference along the horizontal axis and which indicates packet error rate along the vertical axis; and FIG. 10 is a chart indicating permutations of frequencies respectively designated as 0, 1, 2 and 3; and

DETAILED DESCRIPTION OF A PREFERRED EMBODIMENT OF THE INVENTION

Figure 1:
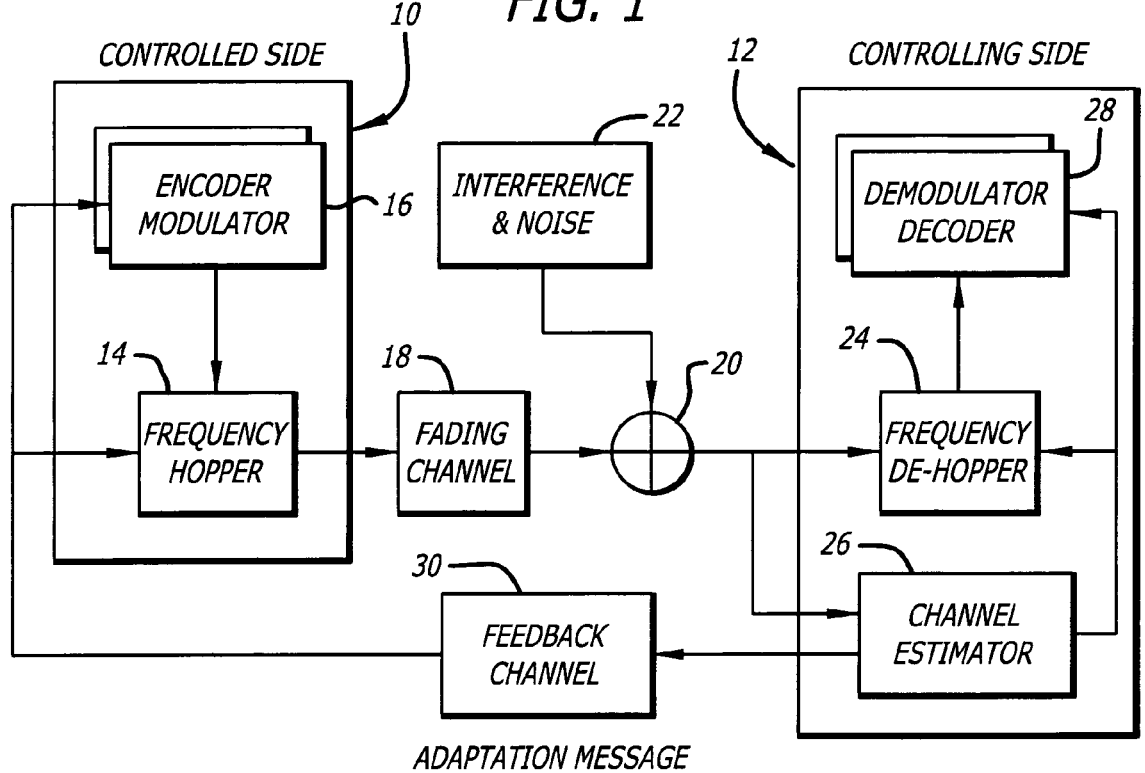
FIG. 1 is a schematic block diagram showing a system including a controlling station and a controlled station and showing the interrelationship between the controlling station and the controlled station in determining the hopping frequencies and the modulations and codings to be used in transmitting data from the controlled station to the controlling station.

In many systems now in use for sending digital data from a controlled station (e.g., a transmitting station), generally indicated at 10 in FIG. 1, to a controlling station (e.g., a receiving station) generally indicated at 12, a plurality of hopping frequencies are provided. In such systems, a first packet is transmitted from the controlled station 10 to the controlling station 12 at a first one of the hopping frequencies in the plurality. The data in a second one of the packets is then transmitted from the controlled station 10 to the controlling station 12 at a second one of the hopping frequencies. The data in a third one of the packets is subsequently transmitted from the controlled station 10 to the controlling station 12 at a third one of the hopping frequencies. The sequence of the different hopping frequencies for use as the carrier for the transmission of the successive data packets from the controlled station 10 to the controlling station 12 is known to the controlled station and the controlling station. By providing a sequence of different hopping frequencies for the transmission of successive data packets from the controlled station 10 to the controlling station, the controlling station 12 is able to differentiate the data packets, transmitted to it through a communication channel or by wireless, from a vast number of other data packets which are transmitted from other controlled stations to other controlling stations.

A considerable number of hopping frequencies are available to the controlled station 10 to serve as the carrier frequencies for data packets transmitted from the controlled station 10 to the controlling station 12. Some of these available hopping frequencies are more desirable than other available hopping frequencies as the carrier frequencies in transmitting data from the controlled station 10 to the controlling station 12. This results in part from the fact that noise and interference may be greater at certain hopping frequencies than at other hopping frequencies in the communication channel between the controlled station 10 and the controlling station 12 or, when transmitted by wireless, may be different on the received signal level for different hopping frequencies. It is accordingly desirable to select the frequencies with the least intensity of noise and interference relative to the transmitted signal as the hopping frequencies for carrying the data from the controlled station 10 to the controlling station 12.

The data passing from the controlled station 10 to the controlling station 12 is modulated and is provided with a coding. The coding may be in the form of patterns of signals, each different pattern being representative of an individual one of a plurality of digital values. The modulation may be in the form of signals modulated at different frequencies on the carrier signal in each packet. It is desirable that the noise and interference in the communication channel between the controlled station 10 and the controlling station 12 attenuate the transmitted signal at the different hopping frequencies as little as possible.

This invention provides a preferred embodiment of a system for, and method of, operating upon a plurality of selectable hopping frequencies to select a pool or a group constituting the hopping frequencies with the highest response of signal in relation to noise and interference. The number of the hopping frequencies in this group or pool is less than the number of the available hopping frequencies in the plurality but is greater than the number of the hopping frequencies which are used at any instant to communicate data from the controlled station 10 to the controlling station 12. The preferred system and method of this invention then identify, from among the hopping frequencies in the pool or group, the hopping frequencies in which particular modulation(s) and/or coding(s) provide the highest ratio of signal to noise and interference and the least number of packet errors at the identified frequencies.

Alternatively, the preferred embodiment and method of this invention operate upon the plurality of hopping frequencies to select the pool or group with the highest ratio of signal to noise and interference. The number in this pool or group may be greater than the number of the hopping frequencies which are used at any instant to transfer data from the controlled station 10 to the controlling station 12. The hopping frequencies with the highest ratio of signal to noise and interference are then isolated from the selected hopping frequencies in the pool or group. An evaluation is then made of the modulation(s) and coding(s).

FIG. 1 is a schematic block diagram showing the operation of the controlled station 10 and the controlling station 12 in selecting the optimal hopping frequencies and in identifying the optimal modulation(s) and coding(s) for these optimal hopping frequencies. It will be appreciated that data may be transmitted from the controlled station 10 to the controlling station 12 during the time that the system shown in FIG. 1 is selecting the optimal hopping frequencies and is identifying the optimal modulation(s) and coding(s) for these optimal hopping frequencies. The system shown in FIG. 1 includes a frequency hopper 14 and an encoder-modulator 16 within the controlled station 10. Information from the encoder-modulator 16 is shown as being introduced to the frequency hopper 14.

The signals from the frequency hopper 14 are introduced to a fading channel 18. Signal travel through different paths in the fading channel 18. The phase differences of these signals relative to the phase of the signals from the frequency hopper 14 may cause the strength of the signals from the frequency hopper 14 to decrease or fade. This is figuratively shown as occurring in the fading channel 18. The signals from the fading channel 18 are shown figuratively as being combined in an adder 20 with noise and interference 22 from the surrounding environment. The noise and interference 22 make it additionally difficult to process the signals from the controlled station 10 at the controlling station 12.

After being subjected to such destabilizing effects as fading, noise and interference, the signal from the frequency hopper 14 is introduced to a frequency de-hopper 24 and to a channel estimator 26 in the controlling station 12. The frequency de-hopper 24 de-hops the frequency hopping provided by the frequency hopper 14. The signals from the frequency de-hopper 24 are introduced to a demodulator-decoder 28 in the controlling station 12. The demodulator-decoder 28 demodulates the modulation(s) provided in the modulator-encoder 16 and decodes the code(s) encoded by the modulator-encoder.

The channel estimator 26 estimates the ratio of the signal to the noise and interference and uses the estimation to select the hopping frequencies which will minimize or at least reduce the noise and interference in the signals passing to the de-hopper 24. The signals from the channel estimator 26 also pass through a feedback channel 30 as an input to the frequency hopper 14 and the encoder-modulator 16. The feedback channel 30 may introduce signals only for the frequencies having optimal ratios of signal to noise and interference. The feedback channel 30 provides adjustments in the operation of the frequency hopper 14 and the encoder-modulator 16 to enhance the operation of the frequency de-hopper 24 and the demodulator-decoder 28 in recovering the hopping frequency at each instant and in recovering the modulation(s) and coding(s) of the signals at the hopping frequency and in recovering the data represented by the modulation(s) and coding(s).

The optimal frequencies for the frequency hopping, and the optimal modulation(s) and coding(s) for these optimal frequencies, may be selected only once at the beginning of each communication. This may be designated as a static adaptation. A static adaptation may be provided when the controlled station 10 and the controlling station 12 are fixed. Under such circumstances, the channel conditions including, and between, the controlled station 10 and the controlling station 12 may be sufficiently stable throughout the period of the communication of data between the controlled station and the controlling station so that changes do not have to be made continuously in such parameters as the selected hopping frequencies and the selected modulation(s) and coding(s) for the selected hopping frequencies.

Since only one set of selections is made in a static adaptation, the selection of the hopping frequencies and the modulation(s) and coding(s) can be made in an extended period of time to insure that the selection is relatively precise. For example, the ratio of signal to noise and interference can be determined for each of the different hopping frequencies in the plurality to select the hopping frequencies in the pool or group. Different modulations and codings can then be evaluated for each of the different hopping frequencies, in the plurality, in terms of the measured packet error rates for these different frequencies, to identify the hopping frequencies. This evaluation can identify, from among the selected hopping frequencies, frequencies which will be used in transmitting data from the controlled station 10 to the controlling station 12. This evaluation can also determine the modulation(s) and coding(s) to be used with the identified hopping frequencies for transmitting the data.

The channel conditions including, and between, the controlled station 10 and the controlling station 12 may sometimes vary with time. Under such circumstances, it may be desirable to evaluate periodically the ratio of signal to noise and interference for the selected hopping frequencies, and for different modulations and codings for the selected hopping frequencies, to determine the optimal hopping frequencies, modulation(s) and coding(s) for use in transmitting data from the controlled station 10 to the controlling station 12. This periodic evaluation may be designated as a dynamic adaptation. The periods between successive evaluations in a dynamic adaptation may be somewhat dependent upon the rate at which variations occur in the channel parameters including, and between, the controlled station 10 and the controlling station 12.

In a dynamic adaptation, the periodic evaluation of the selected hopping frequencies for their ratios of signal to noise and interference, and the evaluation of the modulation(s) and coding(s) to be used for the selected hopping frequencies, may be made after the controlled station 10 has started to communicate data to the controlling station 12. Because of this, when a dynamic adaptation is provided, the evaluation may not be as extended as when a static adaptation is provided. One reason is that the ability to communicate data from the controlled station 10 to the controlling station 12 may be somewhat impaired in a dynamic adaptation during the time that the evaluation of the selected hopping frequencies, and the modulation(s) and coding(s) for the selected hopping frequencies, is being made.

Whether the adaptive frequency hopping results from a static adaptation or a dynamic adaptation, the set of hopping frequencies available in the plurality is partitioned into two subsets—(1) an active frequency subset and (2) a spare frequency subset. This partitioning is based on the ratio of signal to noise and interference at the different hopping frequencies. The hopping frequencies with a high ratio of signal to noise are allocated to the active frequency set. The hopping frequencies actually used in communicating data from the controlled station 10 to the controlling station 12 are the frequencies in the active set with the highest ratios of signal to noise and interference. The frequencies with the lowest ratios of signal to noise and interference are allocated to the spare frequency set and are not available for use in communicating data from the controlled station 10 to the controlling station 12.

Figure 2:
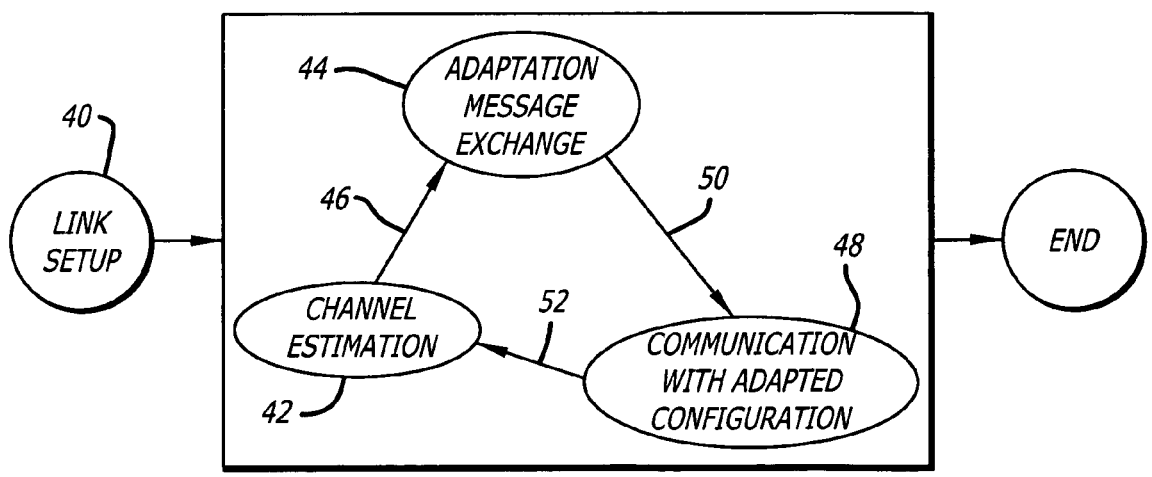
FIG. 2 is a block diagram showing the operation of the controlling station and the controlled station (a) in initially selecting the hopping frequencies and the modulation(s) and the coding(s) to be used in transmitting data from the controlled station to the controlling station, (b) in subsequently providing the information to the controlled station relating to the selected hopping frequencies and the modulation(s) and the coding(s) and (c) in thereafter providing for the transmission of data from the controlled station to the controlling station at the selected hopping frequencies and modulation(s) and coding(s)

FIG. 2 shows, in block form, successive steps involved in the preferred embodiment of the system for, and method of, providing frequency hopping. The blocks in FIG. 2 include a block 40 for providing a link setup between the controlled station 10 and the controlling station 12. As a first step after the link is set up, the controlling station 12 selects the hopping frequencies, and the modulation(s) and coding(s) for the selected hopping frequencies, which will be used in the communication of data from the controlled station 10 to the controlling station 12. This selection has been disclosed previously with particular reference to FIG. 1. This selection is shown schematically in FIG. 2 by a block indicated at 42 and designated as "channel estimation." During this selection by the controlling station of the hopping frequencies and the modulation(s) and coding(s), data is transmitted between the controlled station 10 and the controlling station 12.

The controlled station 10 then learns the hopping frequencies selected by the controlling station 12 and also learns the modulation(s) and coding(s) chosen for the selected hopping frequencies. A block indicated at 44 in FIG. 2 and designated as "Adaptation Message Exchange" is included in FIG. 2 to obtain this information. An arrow 46 extending from the block 42 to the block 44 indicates that the controlled station 10 learns the hopping frequencies, modulation(s) and coding(s) previously selected by the controlling station 12. It will be appreciated that data may be transmitted from the controlled station 10 to the controlled station 12 during the time that the adaptive message exchange is occurring to provide the controlled station 10 with the information concerning the hopping frequencies selected by the controlling station 12 and the modulation (s) and coding(s) chosen for the selected hopping frequencies.

After the controlled station 10 learns the hopping frequencies, modulation(s) and coding(s) selected by the controlling station 12, the controlled station 10 communicates data to the controlling station 12. A block 48 indicates this communication. An arrow 50 extending from block 44 to the block 48 indicates that the communication of data from the controlled station 10 to the controlling station 12 occurs after the controlled station learns the hopping frequencies, modulation(s) and coding(s) selected by the controlling station 12. The communication of data from the controlled station 10 to the controlling station 12 occurs at individual ones of the selected hopping frequencies with the highest ratios of signal to noise and interference.

An arrow 52 is shown as extending from the block 48 to the block 42. This arrow indicates that the sequence of the blocks 42, 44 and 48 is repetitive when dynamic adaptation is involved. This results from the fact that the controlling station 12 periodically identifies the hopping frequencies with the highest ratios of signal to noise and interference from the group or pool of the selected hopping frequencies and uses these hopping frequencies with the highest ratios of signal to noise and interference to provide the frequency hopping.

When static adaptation is involved, the arrow 52 between the blocks 48 and 42 is not included in FIG. 2. This shows that the hopping frequencies with the highest ratios of signal to noise and interference, the modulation(s) and the coding(s) are selected only once. Furthermore, the controlled station 10 learns the selected hopping frequencies, modulation(s) and coding(s) only once.

FIG. 3 schematically shows the block 44 in additional functional detail. In effect, FIG. 3 may be considered as a flow diagram showing the successive steps in providing the controlled station 10 with the hopping frequencies, modulation(s) and coding(s) selected by the controlling station 12 for the transmission of data from the controlled station 10 to the controlling station 12. As a first step indicated at 60, the controlling station 10 sends to the controlled station 10 signals identifying a first group of the hopping frequencies, and the modulation(s) and coding(s) for such hopping frequencies, selected by the controlling station 12. The first group of the selected hopping frequencies is only one of a number of groups identifying the different ones of the hopping frequencies to be used in transmitting data from the controlled station 10 to the controlling station 12. Each group may have NR hopping frequencies. Each of the selected hopping frequencies may be identified by an individual digital value such as a digital value of "1" for a first selected hopping frequency and a digital value of "3" for a third selected hopping frequency, assuming that the first and third hopping frequencies are selected and are active hopping frequencies and that a second hopping frequency between the first hopping frequency and the third hopping frequency is not selected and is considered as a spare hopping frequency. Each individual one of the selected hopping frequencies may be represented by a frequency index. Each frequency index is represented by a binary number.

A second step in the functional diagram in FIG. 3 is indicated at 62. In this step, the controlled station 10 receives the digital signals transmitted by the controlling station 12 to identify the selected hopping frequencies in the first group and the modulation(s) and coding(s) of such hopping frequencies. The controlled station 10 then transmits the received signals back to the controlling station 12. The controlling station 12 then compares the signals received from the controlled station 10 and the signals previously transmitted to the controlled station. If the compared signals are not identical, the controlling station 12 transmits again to the controlled station 10 the signals previously transmitted to the controlled station to identify the first group of the selected hopping frequencies and the modulation(s) and coding(s) for such hopping frequencies. This is indicated at 64 in FIG. 3. The controlled station 10 then transmits to the controlling station 12 the signals received by the controlled station as indicated at 62 in FIG. 3. As indicated at 64 in FIG. 3, the controlling station 12 compares the received signals with the signals most recently transmitted from the controlling station to the controlled station 10. This sequence is repeated until the signals most recently communicated from the controlling station 12 to the controlled station 10 match the signals most recently transmitted from the controlled station to the controlling station.

When the signals most recently transmitted from the controlling station 12 to the controlled station 10 are identical to the signals received by the controlling station from the controlled station, the controlling station transmits to the controlled station the signals identifying the selected hopping frequencies in the next group and the modulation(s) and coding(s) for such hopping frequencies. This is indicated at 64 in FIG. 3. The controlled station 10 knows that these signals provide the information for the selected hopping frequencies in the next group because the signals in this group are different from the signals in the previous group. The comparison of the signals transmitted in the second group by the controlling station 12 with the signals received in the second group by the controlling station is then made in a similar way to that described above for the signals in the first group. This is indicated at 64 in FIG. 3. In this way, the controlled station 10 sequentially receives the identification of the selected hopping frequencies in each of the successive groups and the identification of the modulation(s) and coding(s) of such selected hopping frequencies in each of the successive groups.

FIG. 4 indicates in additional detail the operation of the preferred embodiment in identifying the selected hopping frequencies and the modulation(s) and coding(s) for the selected hopping frequencies. As a first step, the ratio of signal to noise and interference is identified for each hopping frequency. The hopping frequencies are then arranged in a descending order of the ratio of signal to noise and interference. A particular number of the hopping frequencies with the lowest ratio of signal to noise and interference are considered to be in a spare frequency set and are not used in communicating data from the controlled station 10 to the controlling station 12. The remaining hopping frequencies are considered to be in an active frequency set.

Consider now that there are NM candidates of different schemes for providing modulation(s) and coding(s) for the selected hopping frequencies and that the number of selected hopping frequencies is i. Consider that each of the modulations and codings is analyzed at the selected hopping frequencies for a total of TM seconds. The time period TM should be sufficiently long to cover the entire frequency band of the hopping frequencies for one of the NM modulations and codings and to provide a good channel estimation of the operation of communicating data at one of the NM modulations and codings for all of the hopping frequencies. The total time for evaluating all of the NM modulations and codings for all of the different frequencies is accordingly NM.TM.

Two (2) parameters are measured at each of the hopping frequencies. These are:

1. The ratio of signal to noise and interference for each of the hopping frequencies, and
2. The packet error rate for each modulation and coding at the hopping frequencies. The packet error rate may be measured by techniques known in the art. The packet error rate is the rate at which packets transmitted from the controlled station 10 to the controlling station 12 have errors. If packets have errors, the accuracy of the data received at the controlling station 12 from the controlled station 10 is affected.

For each of the $N_M$ different modulations and codings, the packets error rate at the selected hopping frequencies is evaluated. The modulation(s) and coding(s) having the lowest packet error rate are then selected to be used at the hopping frequencies. When selecting the modulation(s) and coding(s) with the lowest packet error rate, the hopping frequencies in the active frequency set are used.

FIG. 4 provides a flow chart for sequentially transmitting NM modulations and codings and for transmitting data with each of the NM modulations and codings at each of the hopping frequencies. The flow chart shown in FIG. 4 provides for an evaluation of the NM different modulations and codings at the hopping frequencies to determine the packet error rate in transmitting data at each of the hopping frequencies. As a first step in FIG. 4, the NM different modulations and codings are provided as at 70. The NM different modulations and codings are processed as at 72 at the hopping frequencies to modulate and encode the carrier signals at the hopping frequencies. The NM different modulations and codings are introduced to a transmitter 74 constituting the controlled station 10 and are transmitted by the transmitter to a receiver 76 constituting the controlling station 12. In these transmissions, the system evaluates, on the basis of the ratio of the signal to noise and interference, the rate of packet errors produced at each of the hopping frequencies.

A determination is made as at 78 in FIG. 4 of the time for testing each individual one of the modulations and codings. If the time for evaluating any individual one of the NM modulations and codings at the hopping frequencies is less than the time TM allocated for that individual one of the modulations and codings, a signal indicating a time period less than the time period indicated by the TM signal is produced in a line 80. This signal is introduced to the block 72 to provide for a continuation in the evaluation of the individual one of the NM modulations and codings at the hopping frequencies.

When the time TM has elapsed in the timing block 80 for evaluating the packet error rate at each of the hopping frequencies, a signal is produced on a line 82 for introduction to a block 84. The block 84 determines whether all of the NM modulations and codings have been evaluated to determine the packet error rate at each of the hopping frequencies. If all of the N M modulations and codings have not been evaluated, a signal is produced on a line 86 for introduction to the block 70. The block 72 then causes the next one of the NM modulations and codings to be introduced to the transmitter 74 for an evaluation of the packet error rate produced with the next one of the NM modulations and codings at each of the hopping frequencies.

When all of the NM modulations and codings have been evaluated for the rate of packet errors at each of the hopping frequencies, a signal is introduced from the block 84 to a line 88. This signal is introduced to the transmitter 74 and the receiver 76 to indicate that the evaluation of the NM modulations and codings at each of the hopping frequencies has been completed. On the basis of the ratio of the signal to noise and interference for each of the hopping frequencies, an analysis is made to determine which ones of the hopping frequencies will be used to transmit data from the controlled station 10 to the controlling station 12. On the basis of the packet error rates for each of the NM modulations and codings at each of the active or selected hopping frequencies, an analysis is also made to determine the particular one(s) of the NM modulations and codings that will be used in transmitting data from the controlling station 10 to the controlled station 12. When these analysis and determinations have been made, the system proceeds from the channel estimation 42 in FIG. 2 to the adaption message exchange 44 in FIG. 2. In the adaption message exchange 44, the controlled station 10 determines from the controlling station 12 the particular ones of the hopping frequencies and the particular one(s) of the NM modulations and codings to be used in transmitting data from the controlled station 10 to the controlling station 12. It will be appreciated that a plurality of different modulations and codings may be selected and that each individual one of these selected modulations and codings may be used with a different group or groups of the active hopping frequencies in transmitting data from the controlled station 10 to the controlling station 12.

The evaluation of the packet error rate for the Kth modulation and coding may be made on the basis of the following equation:

$$PER(K) = 1\ddot{y}\sum_{Npi=1}^{i=AFS} NPE(i,K) \text{ where} \tag{1}$$

PER (K)=The packet error rate for the Kth modulation and coding;

Np=The number of packets transmitted from the controlled station 10 to the controlling station 12 for the Kth modulation and coding;

NPE=The number of packet errors produced for the Kth modulation and coding at the ith hopping frequency in the active frequency set; and AFS=The number of frequencies in the active or selected frequency set.

Equation (1) may be known in the prior art but not for the purposes of the preferred embodiment of this invention.

The system or flow chart shown in FIG. 4 and described above has certain important advantages and one significant disadvantage. One advantage is that it is quite thorough in evaluating the modulation(s) and coding(s) which should be used with the selected hopping frequencies. Because of this, the optimal modulation(s) and coding(s) are chosen to be used with the selected hopping frequencies. The chosen modulation(s) and coding(s) cause a minimum number of packet errors to be produced in transmitting data from the controlled station 10 to the controlling station 12. A significant disadvantage is that a relatively long period of time is required to evaluate the different modulations and codings before selecting the optimal modulation(s) and coding(s).

FIG. 5 shows another system or flow chart which can be used in place of the flow chart shown in FIG. 4. In FIG. 5, a single modulation and coding designated as K is used for the entire period in evaluating the optimal parameters to be used in transmitting data from the controlled station 10 to the controlling station 12. An advantage of the system shown in FIG. 5 is that the evaluation period can be considerably shorter than the evaluation period for the system shown in FIG. 4. A disadvantage is that the evaluation provided by the system shown in FIG. 5 may not be as thorough or precise as the evaluation provided by the system shown in FIG. 4.

In providing the evaluation by the system or flow chart shown in FIG. 5, the packet error rate at each of the different hopping frequencies for the K modulation and coding is evaluated by using the ratio of signal to noise and interference for each of the different hopping frequencies. This is indicated by the following:

$$PER(K) = \ddot{y}\sum_{i=1}^{i=AFS} PK(SNRi) \text{ where} \tag{2}$$

PER (K)=The packet error rate for the K modulation and coding;

SNR (i)=The ratio of signal to noise and interference for the (i) hopping frequency in the active frequency set;

AFS=The number of hopping frequencies in the active frequency set; and

PK=The packet error rate for the K modulation and coding at the ith hopping frequency when SNR is SNRi.

The time for estimating the packet error rate for all of the hopping frequencies is T-CE.

As indicated at 90 in FIG. 5, the evaluation is commenced at time t=O. Successive ones of the hopping frequencies are selected for evaluation as indicated at 92. Data with the K modulation and coding is transmitted at each of the hopping frequencies from the controlled station 10 to the controlling station 12, as indicated at 94. The ratio of the signal to noise and interference for each of the hopping frequencies is determined during such transmission, as indicated at 96. After the transmission of data at each of the hopping frequencies, a determination is made as at 98 of whether the total elapsed time is less than T-CE. If this is true, a signal is provided on a line 100 to select the next one of the hopping frequencies for transmission. If the elapsed time T has reached T-CE, a signal is produced on a line 102. On the basis of the ratio of the signal to noise and interference at each of the hopping frequencies, the hopping frequencies to be used in the transmission of data from the controlled station 10 to the controlling station 12 are identified. The adaptation message exchange 44 in FIG. 2 is then provided to indicate to the controlled station 10 the hopping frequencies and the modulation and coding to be used in the transmission of data from the controlled station 10 to the controlling station 12.

Figure 6A:
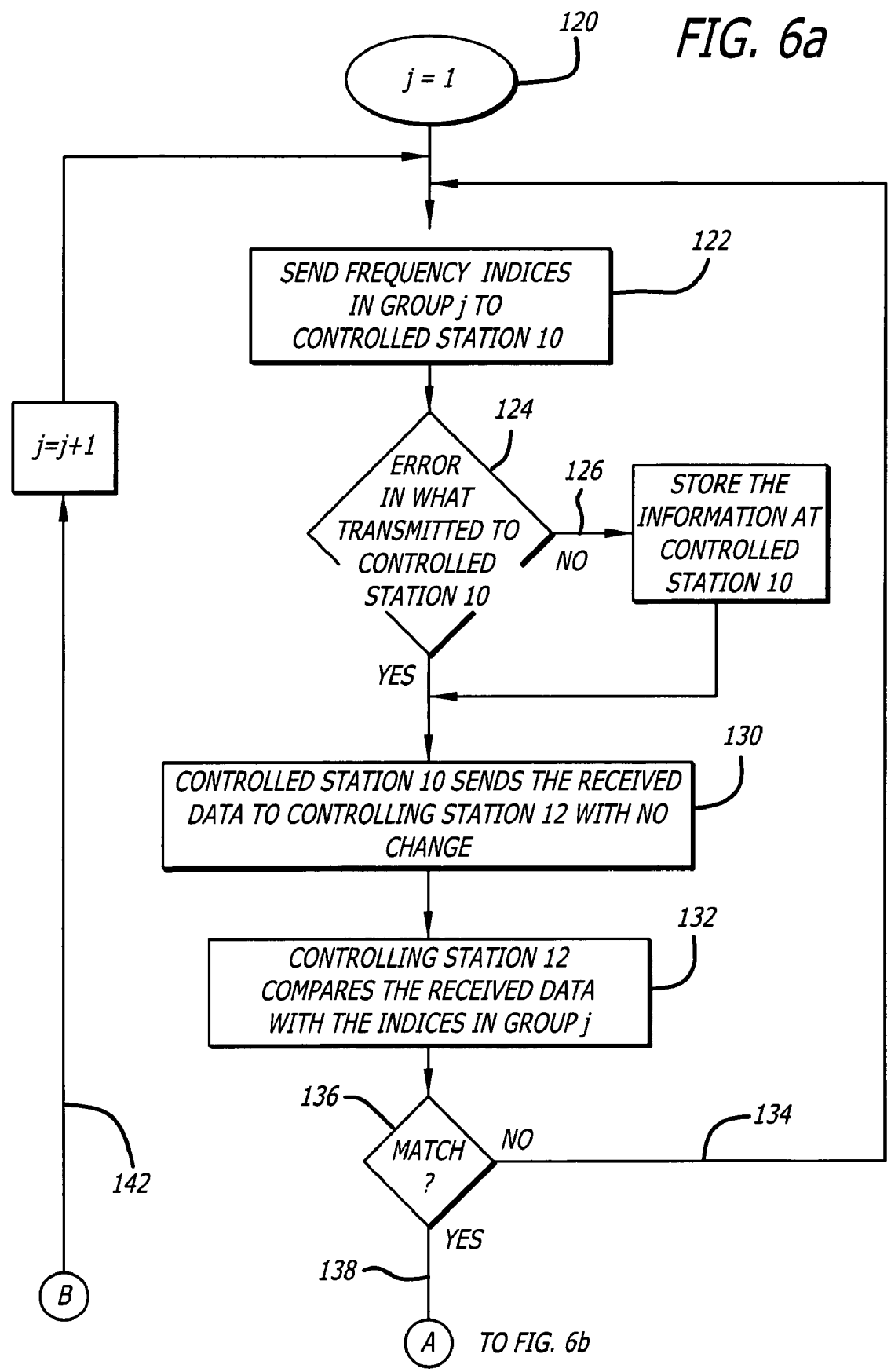

FIGS. 6a and 6b cumulatively provide a flow chart showing the successive steps in communicating information from the controlled station 10 to the controlling station 12 concerning the hopping frequencies and the modulation(s) and coding(s) to be used in transmitting data from the controlled station 10 to the controlling station 12. FIGS. 6a and 6b accordingly accomplish a number of the same results as is provided by the block 44 in FIG. 2 and by the flow chart shown in FIG. 3. However, FIGS. 6a and 6b are more detailed than the block 44 in FIG. 2 and somewhat more detailed than the flow chart shown in FIG. 3.

As previously indicated, the controlling station 12 sends to the controlled station 10 information identifying the hopping frequencies to be used in the transmission of data by the controlled station to the controlling station. This information is sent in packets each of which includes the identity of a number of the hopping frequencies in the active set. Although the controlling station 12 serves as the receiver when data is transmitted by the controlled station 10 operating as a transmitter, the controlling station 12 selects the hopping frequencies and the modulation(s) and coding(s) and transmits this information to the station 10 because it is better able than the station 10 to determine the degrading effects of noise and interference and other parameters on the data received by it at the different hopping frequencies from the station 10.

Each of the frequencies may be considered as a frequency index and may be represented by a binary number of a length. The number of the frequency indices transmitted per packet by the controlled station 10 to the controlling station 12 per packet may be defined NFI. The number of frequency groups or packets to be sent by the controlling station 10 to the controlled station 12 may be defined as NFG. On this basis, NFG=⌈SFS⌉ where SFS is the size of the spare frequency ÿ NFiÿ set. The spare frequency set may be used when the number of the hopping frequencies in the spare frequent set (SFS) is less than the number of the hopping frequencies in the active frequency set. The notation ÿSFSÿ indicates the smallest integer greater than or equal to SFS.

ÿNfiÿNfi

In FIGS. 6a and 6b, j may be used to identify the group of active frequencies provided in a single packet. The group j of active frequencies may accordingly have any value between 1 and NFG. As indicated at 120 in FIG. 6a, an operation is initiated by providing j with a value of 1. A block 122 in FIG. 6a indicates that the controlling station 12 sends the group of frequency indices to the controlled station 10. The controlled station 10 then determines whether there has been an error in what has been transmitted to the controlled station. This is indicated at 124. If there has been no error, a signal is provided through a line 126 to have the received information stored at the controlled station 10 as indicated at 128.

As indicated at 130, the controlled station 10 sends the received data without change to the controlling station 12. The controlling station 12 compares the data transmitted to the controlled station 10 and the data received from the controlled station. This is indicated at 132. If there is no coincidence in the compared data, the controlling station 12 sends a signal, as indicated at 134, to stages in the controlling station 12 to have the group of frequency indices retransmitted by the controlling station to the controlled station 10. The operations described above are indicated by the blocks 124, 126, 128, 130, 132 and 134. This process is repeated until a match occurs in a block 136 between the data transmitted by the controlling station 12 to the controlled station 10 and the data received by the controlling station from the controlled station. In each of these successive transmissions, the controlled station 10 replaces the previously stored information as at 128 with the information newly received from the controlling station 12.

When a match occurs in the block 136, a signal is produced in a line 138 (FIGS. 6a and 6b) and is introduced to a stage which determines, as indicated at 140, whether the number of the groups of the frequency indices transmitted from the controlling station 12 to the controlled station 10 is less than NFG, the number of the groups of active hopping frequencies. If the answer is yes, a signal is provided on a line 142 (FIGS. 6a and 6b) to initiate the transmission of the next group of the frequency indices from the controlling station 12 to the controlled station 10.

When the frequency indices for NFG groups of the hopping frequencies have been transmitted, a signal is provided on a line 144 in FIG. 6b. The controlling station 12 then sends a packet to the controlled station 10 to indicate the selected modulation and coding. This is indicated at 146 in FIG. 6b. If there has been no error in the transmission as indicated at 148, the information is stored at the controlled station 10 as indicated at 150. The controlled station 10 then sends to the controlling station 12 the information received by it. This is indicated at 52. As indicated at 154, the controlling station 12 determines if there is a match between the information transmitted by it to the controlled station 10 and the information received by it from the controlled station.

If there is no match in the stage 154, a signal is introduced on a line 156 to the line 144 for introduction to the stage 146 to obtain a transmission of the selected modulation and coding to the controlled station 12. Operations are then provided as indicated at 148, 150, 152 and 154 to obtain a storage of the information in the controlled station 10 in replacement of the previously stored information and to obtain a transmission of this information to the controlling station 12. This cycle is repeated until the information transmitted by the controlling station 12 to be controlled station 10 matches the information received by the controlling station from the controlled station. When this match occurs, a signal is provided on a line 158 to initiate a countdown procedure as indicated at 160.

The countdown procedure is initiated to insure that the controlled station 10 and the controlling station 12 operate in a synchronous relationship in the transmission of data from the controlled station 10 to the controlling station 12. The countdown procedure is provided after the controlled station 10 has received from the controlling station 12 the information relating to the active hopping frequencies and the modulation(s) and coding(s) used in transmitting data from the controlled station 10 to the controlling station 12 and before the transmission of such data is initiated. The countdown procedure involves a sequential transmission of a particular countdown index or code from the controlling station 12 to the controlled station 10 for a particular number of times. After each such transmission, the controlling station 12 increments a count by an integer until the particular count is reached. The controlled station 10 also counts the particular countdown index until the particular count is reached. When the particular count is reached in the controlling station 12 and the controlled station 10, a transmission of data from the controlled station 10 to the controlling station 12 is initiated.

FIG. 7 provides a flow chart of the successive steps provided by the controlling station 12 in the countdown procedure. The procedure is initiated, as indicated at 170, with a countdown index of 1. The controlling station 12 sends the countdown index or code to the controlled station, as indicated at 172. After such transmission, the count in a counter is incremented by an integer. This is indicated at 174 in FIG. 7. After such increment, the count in the counter is compared with a preset count designated as Ncd+1. This is indicated at 176 in FIG. 7. If the count in the counter is less than Ncd+1, a signal is produced on a line 178 to provide for the transmission of another countdown index or code from the controlling station 12 to the controlled station 10. This sequence is repeated until a signal is produced on a line 180 to indicate that the count of $N_{cd}+1$ has been reached. The communication of data from the controlled station 10 to the controlling station 12 is then initiated, as indicated at 182.

FIG. 8 is a flow chart indicating the successive steps provided by the controlled station 10 in the countdown procedure as indicated at 184, the controlled station 10 determines if there is an error in the countdown signals that it receives from the controlling station 12. If there is no error, the controlled stage 10 produces a countdown signal or index on a line 186. The controlled station 10 stores the countdown signals or indices. This is indicated at 188. The controlled station 10 then increments by a value of 1, as indicated at 190, the count of the number of countdown indices received by the controlled station from the controlling station 12. When the count of the number of countdown signals or indices received by the controlled station 10 from the controlling station 12 reaches NCD+1 as indicated at 192, the controlled station 10 produces a signal on a line 194. This causes the transmission of data from the controlling station 12 to the controlled station 10 to be initiated.

As previously indicated, the modulations can be provided by frequency shift keying. In such frequency shift keying, different frequencies may be used to send information bits. As a result of multi-path fading and interference as discussed above in connection with FIG. 1, the ratio of signal to noise and interference can be different for each frequency.

Suppose that frequencies i, i+1 . . . i+M−1 are used to provide frequent shift keying of M frequencies and that SNR(i) denotes the ratio of signal to noise for the i frequency and interference and SNR (i+M−1) denotes the ratio of signal to noise and interference at the frequency of i+M−1. Then the lowest value of the SNR ratio for the different M frequencies is used to predict the error performance for all of the M different frequencies. It would accordingly be desirable to improve the SNR ratio for the different frequencies, particularly the frequencies with the lowest SNR ratios, since the SNR ratio with the lowest value determines the error performance.

FIG. 9 is a curve which indicates the ratio of signal to noise and interference along the horizontal axis and which indicates the packet error rate along the vertical axis. As will be seen, for a zero value of the ratio of signal to noise and interference, the packet error rate is highest. The packet error rate decreases as the ratio of signal to noise and interference increases.

FIG. 10 provides a permutation code which tends to maintain an average of signal to noise and interference for the M different frequencies. By averaging, the lowest ratios of signal to noise and interference for the different frequencies tend to rise toward the average. This is desirable since the lowest value of the ratio of the signal to noise and interference is used to predict the error performance for all of the M different frequencies.

FIG. 10 shows four different binary values designated as 00, 01, 10 and 11. The four binary values may be represented by four different frequency patterns as follows:

| BINARY VALUES | FREQUENCY PATTERNS |
| --- | --- |
| 00 | 1203 |
| 01 | 0231 |
| 10 | 1320 |
| 11 | 0132 |

As will be seen, the binary patterns represent four (4) Arabian numbers between "0" and "3". The binary values may be represented by four (4) frequencies figuratively represented by "0", "1", "2" and "3". As will be seen, each of the frequency patterns has a single occurrence of each of the 0, 1, 2 and 3 frequencies. Because of this, each frequency has the same weighted effect as the other frequencies when testing for the ratio of signal to noise and interference. This is true regardless of the binary value represented by the four (4) frequencies. Since each frequency is produced only once for each binary value regardless of the pattern of frequencies being tested, the testing for the packet error rate tends to become equalized for the four (4) different frequencies. This provides for an enhanced accuracy in the value of the packet error rate at each of the different frequencies.

FIG. 10 also indicates successive permutation of pairs of the 0, 1, 2 and 3 frequencies. Starting with a frequency pattern of 0123, a first permutation occurs when the frequencies 1 and 2 are inverted to produce a pattern of 0213. A second permutation may involve a transposition of 1 and 3 and may cause a frequency pattern of 0231 to be produced. A third permutation may involve a transposition of 0 and 2 and may cause a frequency pattern of 2031 to be produced. A fourth permutation occurs when the 3 and 1 frequencies are inverted to produce a pattern of 2013. Applicant uses only the even (e.g., the second and fourth) permutations. Thus, applicant may use the patterns 0123, 0231 and 2013 specified above. It is believed that a person of ordinary skill in the art will be able to provide other even permutations.

Suppose that data on the even permutation pattern of 0231 is transmitted from the controlled station 10 to the controlling station 12 and that noise and interference cause the controlling station to receive only the second and third frequencies 2 and 3. The controlled station knows from the signal patterns that the first frequency in the pattern has to have a value of 0 or 1 and that the fourth frequency in the pattern has to have a value of the other one of 0 and 1. By using only even permutation patterns and by choosing the even permutation patterns judicially, the controlling station 12 may be able to deduce that the first frequency in the pattern has to have a value of 0 and that the last frequency in the pattern has to have a value of 1. The permutation code described above accordingly has a significant advantage in minimizing the number of packet errors that are produced in the transmission of data from the controlled station 10 to the controlling station 12 even when some of the data is lost in the transmission.

What is claimed is:

1. A method of using hopping frequencies to provide a transmission and reception of data, including the steps of:
   providing a plurality of different hopping frequencies,
   providing a plurality of different data modulations,
   providing a plurality of different codings,
   providing a ratio of signal to noise and interference for each of the hopping frequencies, and
   selecting each individual one of a number of the different hopping frequencies, and an individual one of the data modulations and an individual one of the codings for each individual one of such hopping frequencies, from the plurality of the different hopping frequencies and from the plurality of data modulations and the plurality of codings, on the basis of an optimal ratio of the signal to the interference and noise for each individual one of such selected hopping frequencies and the data modulation and coding for the selected hopping frequency.

2. A method as set forth in claim 1 wherein
   the number of hopping frequencies selected is greater than the number of the hopping frequencies used in the transmission at any instant between a controlled station and a controlling station and wherein
   each individual one of the hopping frequencies selected is dependent upon the ratio of the signal to interference and noise for the individual one of the selected hopping frequencies.

3. A method as set forth in claim 1 wherein
   each individual one of the selected hopping frequencies used in the transmission of data between a controlled station and a controlling station is periodically determined on the basis of the ratio of the signal to interference and noise for the hopping frequency.

4. A method as set forth in claim 1 wherein
in addition to the ratio of signal to interference and noise for each individual one of the selected hopping frequencies, a packet error rate is determined for each individual one of the hopping frequencies and wherein
the selection of each individual one of the hopping frequencies is also dependent on the packet error rate determined for the individual one of the hopping frequencies.

5. A method as set forth in claim 1 wherein
in addition to the ratio of signal to interference and noise for each individual one of the hopping frequencies, a packet error rate is determined for each individual one of the hopping frequencies and wherein
the determination of each individual one of the data modulations and each individual one of the codings for each individual one of the selected hopping frequencies is made on the basis of a measurement of the packet error rate with different data modulations and different codings for the individual one of the selected hopping frequencies.

6. A method of using hopping frequencies to provide a transmission and reception of data from a controlled station to a controlling station, including the steps of:
providing a plurality of hopping frequencies,
determining the ratio of signal to interference and noise for each individual one of the hopping frequencies in transmitting data from the controlled station to the controlling station,
selecting each individual one of the hopping frequencies in a group of hopping frequencies based upon the ratio of the signal to interference and noise for each individual one of such hopping frequencies where the number of the hopping frequencies in the group is less than the number of the hopping frequencies in the plurality,
providing a plurality of different data modulations and a plurality of different codings, and
based upon the ratio of the signal to interference and noise for each individual one of the selected hopping frequencies, selecting an individual one of the data modulations and an individual one of the codings for each individual one the selected hopping frequencies.

7. A method as set forth in claim 6 wherein
a packet error rate is determined for each individual one of the data modulations and each individual one of the codings at each individual one of the selected hopping frequencies and wherein
each individual one of the selected hopping frequencies used in the transmission of data from the controlled station to the controlling station is chosen on the basis of the packet error rate for the hopping frequency.

8. A method as set forth in claim 6 wherein
a packet error rate is determined for each individual one of the data modulations and each individual one of the codings at each individual one of the selected hopping frequencies and wherein
the data modulations and codings used in the transmission of data from the controlled station to the controlling station are determined at each individual one of the selected hopping frequencies on the basis of the packet error rate for the individual one of the data modulations and the individual one of the codings for the individual one the selected hopping frequencies.

9. A method as set forth in claim 6 wherein
the controlling station selects each of the hopping frequencies in the group and communicates the selected hopping frequencies to the controlled station.

10. A method as set forth in claim 8 wherein
the controlling station selects each individual one of the hopping frequencies and each individual one of the data modulations and each individual one of the codings for each individual one of the selected hopping frequencies and communicates the selected hopping frequency, and the selected data modulation and the selected coding for the selected hopping frequency, to the controlled station.

11. A method of using hopping frequencies to provide a transmission of data between a controlling station and a controlled station, including the steps of:
providing on a sequential basis first, second and third periods of time,
providing at the controlling station in each of the first periods of time for a selection of each individual one of a particular number of hopping frequencies from a plurality of hopping frequencies greater than the particular number,
providing at the controlling station in each of the second periods of time for a communication from the controlling station to the controlled station of each individual one of the particular number of the hopping frequencies, and
providing in each of the third periods of time for the transmission from the controlled station to the controlling station of data at each individual one of the particular number of the hopping frequencies.

12. A method as set forth in claim 11 wherein
data is also transmitted in each of the first time periods to the controlling station from the controlled station at each individual one of the selected ones of the hopping frequencies.

13. A method as set forth in claim 11 wherein
data is also transmitted in each of the second time periods to the controlling station from the controlled station.

14. A method of using hopping frequencies to provide a transmission and reception of data, including the steps of:
providing a plurality of different hopping frequencies,
providing a plurality of different data modulations,
providing a plurality of different codings,
providing a ratio of signal to noise and interference for each individual one of the different hopping frequencies, and
selecting an individual one of the hopping frequencies, and an individual one of the data modulation(s) and an individual one of the codings for each individual one of such selected hopping frequencies, on the basis of an optimal ratio of signal to interference and noise for each individual one of the selected hopping frequencies.

15. In a method as set forth in claim 14, including the steps of:
transmitting from a controlling station to a controlled station in each of the second time periods indices of successive groups of the selected hopping frequencies, the second time periods being different from the first time periods, and
confirming from the controlled station to the controlling station the indices of the selected hopping frequencies transmitted in each of the successive groups from the controlling station to the controlled station before the next one of the successive groups of the selected hopping frequencies is transmitted from the controlling station to the controlled station.

16. A method of using hopping frequencies to provide a transmission of data between a controlling station and a controlled station, including the steps of:
providing a plurality of hopping frequencies,
providing sequences of first, second and third periods of time, the first periods, the second periods and the third periods in each sequence being different from one another,
selecting, from the plurality of the hopping frequencies in the first periods of time in each sequence, the hopping frequencies to be used in the transmission of the data between the controlling station and the controlled station,
communicating, from the controlling station to the controlled station in the second periods of time in each sequence, the selection of the hopping frequencies to be used in the transmission of data between the controlling station and the controlled station, and
transmitting the data from the controlled station to the controlling station in the third periods of time in each sequence at each of the selected hopping frequencies.

17. A method as set forth in claim 16, including the steps of:
selecting, in the first periods of time, an individual one of the data modulations and an individual one of the codings for each individual one of the selected hopping frequencies, and
communicating, from the controlling station to the controlled station, in the second periods of time in each sequence, the selected one of the codings and the selected one of the data modulations for each individual one of the selected hopping frequencies, and
transmitting the data at each individual one of the selected hopping frequencies with the selected one of the data modulations and the selected one of the codings from the controlled station to the controlling station in the third periods of time in each sequence.

18. In a method as set forth in claim 16, the steps of:
communicating from the controlling station to the controlled station in the second time periods in each sequence indices of the selected hopping frequencies in successive groups,
receiving at the controlled station in the second time periods in each sequence the indices of the selected hopping frequencies in the selected groups,
communicating from the controlled station to the controlling station in the third time periods in each sequence the indices received at the controlled station of the selected hopping frequencies communicated from the controlling station to the controlled station in the successive groups,
receiving at the controlling station in the third time periods in each sequence the indices of the selected hopping frequencies communicated in the successive groups from the controlled station to the controlling station,
determining at the controlling station in the third time periods if there is a coincidence, or a lack of coincidence, between the indices of the selected hopping frequencies communicated in the successive groups in each sequence by the controlling station to the controlled station and the indices of the selected hopping frequencies received in the successive groups by the controlling station from the controlled station in each sequence, and communicating from the controlling station to the controlled station in the second time periods in each sequence the indices of the selected hopping frequencies in the next one of the successive groups when there is a coincidence between the indices of the selected hopping frequencies communicated by the controlling station to the controlled station in the previous one of the successive groups and the indices of the selected hopping frequencies received by the controlling station from the controlled station in the previous one of the successive groups.

19. In a method as set forth in claim 16, the steps of:
communicating from the controlling station to the controlled station in the second time periods in each sequence the indices of the selected hopping frequencies in the successive groups when there is a lack of a coincidence between the indices of the selected hopping frequencies communicated in the successive groups by the controlling station to the controlling station and the indices of the selected hopping frequencies received in the successive groups by the controlling station from the controlled station.

20. A method as set forth in claim 16 wherein
the ratio of the signal to interference and noise is analyzed at the controlling station at each individual one of the hopping frequencies in each sequence and wherein
each individual one of the hopping frequencies is selected by the controlling station in the first periods of time in each sequence on the basis of the analyses at the controlling station of the ratio of the signal to interference and noise at the hopping frequency.

21. In a method as set forth in claim 19 wherein
the data communicated between the controlling station and the controlled station at the selected hopping frequencies in each sequence have particular modulation(s) and coding(s) and wherein
the particular modulation(s) and the particular coding(s) for the selected hopping frequencies in each sequence are selected by the controlling station in the first periods of time on the basis of the relative value of symbol error rate equations relating to modulations and codings.

22. A method as set forth in claim 16 wherein
a packet error rate is provided for each individual one of the hopping frequencies and wherein
each individual one of the hopping frequencies is selected in the first period of time in each sequence on the basis of the packet error rate at the individual one of the hopping frequencies.

23. A method as set forth in claim 16 wherein
a packet error rate is provided for each individual one of the hopping frequencies and wherein
an individual one of data modulations and an individual one of codings for each individual one of the selected hopping frequencies in each sequence are selected on the basis of the packet error rate for the individual one of the selected hopping frequencies with the individual one of the data modulations and the individual one of the codings at the individual one of the selected hopping frequencies.

24. A method of using hopping frequencies to provide a transmission and reception of data, including the steps of:
providing a plurality of hopping frequencies,
providing a particular data modulation and a particular coding for each individual one of the hopping frequencies, determining a packet error rate for signals at each individual one of the hopping frequencies with the particular data modulation and the particular coding, and selecting each individual one of the hopping frequencies on the basis of the packing error rate for the signals at the individual one of the hopping frequencies with the particular data modulation and the particular coding.

25. A method as set forth in claim 24 wherein the ratio of signal to noise and interference is determined for the signals at each individual one of the hopping frequencies in the plurality with the particular modulation and the particular coding and wherein the packet error rate is determined for the signals at each individual one of the hopping frequencies in the plurality with the particular modulation and the particular coding on the basis of the ratio of the signal to noise and interference at such hopping frequency with the particular data modulation and the particular coding, and wherein each individual one of the hopping frequencies is selected on the basis of the ratio of the signal to noise and interference and the packing error rate at the individual one of the hopping frequencies with the particular data modulation and the particular coding.

26. A method as set forth in claim 24 wherein each individual one of the hopping frequencies is selected by a controlling station on the basis of the packing error rate for the signals at the individual one of the hopping frequencies with the particular data modulation and the particular coding and wherein a controlling station communicates each individual one of the selected hopping frequencies with the particular data modulation and the particular coding to a controlled station.

27. A method as set forth in claim 25 wherein each individual one of the hopping frequencies is selected by a controlling station on the basis of the packing error rate for the signals with the particular data modulation and the particular coding at the individual one of hopping frequencies and wherein the controlling station communicates each individual one of the selected hopping frequencies with the particular data modulation and the particular coding to the controlled station and wherein the controlled station thereafter communicates data to the controlling station with the particular data modulation and the particular coding at each individual one of the selected hopping frequencies.

28. A method of using hopping frequencies to provide a transmission and reception of data, including the steps of:

providing a plurality of hopping frequencies, providing a plurality of data modulations and a plurality of codings, determining a packet error rate for signals at each individual one of the hopping frequencies with each individual one of the data modulations and each individual one of the codings, and selecting each individual one of a number of the hopping frequencies, and a particular one of the data modulations and a particular one of the codings for each individual one of the selected hopping frequencies at a controlling station from the plurality of the hopping frequencies and the plurality of the data modulations and the plurality of the codings on the basis of the packet error rate for the signals at the individual one of the hopping frequencies with each individual one of the data modulations and each individual one of the codings.

29. A method as set forth in claim 28 wherein the ratio of signal to noise and interference is determined for the signals at each individual one of the hopping frequencies with each individual one of the data modulations and each individual one of the codings and wherein the packet error rate is determined for the signals at each individual one of the hopping frequencies with each individual one of the data modulations and each individual one of the coding on the basis of the ratio of the signal to noise and interference at the individual one of the hopping frequencies with the individual one of the data modulations and the individual one of the codings.

30. A method as set forth in claim 28 wherein each individual one of the data modulation(s) and each individual one of the codings are selected for each individual one of the hopping frequencies with each individual one of the data modulations and each individual one of the codings on the basis of the packing error rate for the signals at the individual one of the hopping frequencies with the individual one of the data modulations and the individual one of the codings.

31. A method of using hopping frequencies to provide a transmission and reception of data, including the steps of:

providing a plurality of hopping frequencies, providing a plurality of data modulations and a plurality of codings, determining a packet error rate for signals at each individual one of the hopping frequencies with each individual one of the data modulations and each individual one of the codings, and selecting each individual one of the hopping frequencies, and an individual one of the data modulation(s) and an individual one of the codings for each individual one of the hopping frequencies, on the basis of the packet error rate for the signals at the individual one of the selected hopping frequencies with the individual one of the data modulations and the individual one of the codings.

32. A method as set forth in claim 31 wherein the ratio of the signal to noise and interference is determined for the signals at each individual one of the selected hopping frequencies with the individual one of the data modulations and the individual one of the codings and wherein the packing error rate is determined for the signals at each individual one of the selected hopping frequencies with each individual one of the data modulations and each individual one of the codings at least partially on the basis of the ratio of the signal to noise and interference at each selected one of the hopping frequencies with the individual one of the data modulations and the individual one of the codings.

33. A method of using hopping frequencies to provide a transmission of data between a controlled station and a controlling station, including the steps of, providing signals having a plurality of hopping frequencies at the controlling station, selecting at the controlling station signals having optimal ratios of signals to noise and interference for each individual one of a number of hopping frequencies in the plurality, transmitting from the controlling station to the controlled station information identifying each individual one of the selected hopping frequencies having the optimal ratio of signal to noise and interference, and transmitting from the controlled station to the controlling station data at each individual one of the selected hopping frequencies having an optimal ratio of signals to noise and interference.

34. A method as set forth in claim 33, including the steps of:

providing a plurality of data modulations, providing a plurality of codings, providing a selection of an individual one of the data modulations and an individual one of the codings for each individual one of the selected hopping frequencies on the basis of the ratio of the signal to noise and interference at the individual one of the selected hopping frequencies when the individual one of the data modulations and the individual one of the codings are applied to the signal at the individual one of the selected hopping frequencies, and transmitting the data from the controlled station to the controlling station at each individual one of the selected hopping frequencies with the selected one of the data modulations and the selected one of the codings for the individual one of the selected hopping frequencies.

35. A method as set forth in claim 33, including the steps of:

providing a plurality of data modulations, providing a plurality of codings, providing a selection of an individual one of the data modulations and an individual one of the codings for each individual one of the selected hopping frequencies to minimize the packet error rate at the individual one of the selected hopping frequencies, and transmitting the data from the controlled station to the controlling station at each individual one of the selected hopping frequencies with the selected one of the data modulations and the selected one of the codings for the individual one of the selected hopping frequencies.

36. A method as set forth in claim 33 wherein each individual one of the selected hopping frequencies of the signals is periodically determined at the controlling station and is transmitted by the controlling station to the controlled station and wherein the controlled station thereafter transmits the data to the controlling station at each individual one of the periodically selected hopping frequencies.

37. A method as set forth in claim 34, wherein:

the selection of each individual one of the hopping frequencies of the signals is periodically determined at the controlling station and wherein the selection of each individual one of the data modulations and each individual one of the codings for each individual one of the selected hopping frequencies is periodically determined at the controlling station and wherein information relating to the periodic selection of each individual one of the hopping frequencies with the selected one of the data modulations and the selected one of the codings is transmitted from the controlling station to the controlled station and wherein the controlled station thereafter transmits the data to the controlling station at each individual one of the periodically selected hopping frequencies with the selected one of the data modulations and the selected one of the codings for the individual one of the periodically selected hopping frequencies.

38. A method as set forth in claim 35, wherein:

each individual one of the selected hopping frequencies is periodically determined at the controlling station and wherein information relating to the periodic selection of each individual one of the hopping frequencies is transmitted from the controlling station to the controlled station and wherein the selection of each individual one of the data modulations and each individual one of the codings for each individual one of the selected hopping frequencies is periodically determined at the controlling station at the time of the selection of each individual one of the of hopping frequencies, and wherein the controlled station thereafter transmits the data to the controlling station at each individual one of the newly selected hopping frequencies with the newly selected one of the data modulations and the newly selected one of the codings.

39. A method of using hopping frequencies to provide a transmission of data between a controlled station and a controlling station, including the steps of:

providing signals having a plurality of hopping frequencies at the controlled station, providing a plurality of data modulations at the controlled station, providing a plurality of codings at the controlled station, transmitting, from the controlled station to the controlling station, signals at each individual one of the hopping frequencies with each individual one of the data modulations and each individual one of the codings, determining at the controlling station the ratio of signal to noise and interference at each individual one of the hopping frequencies with each individual one of the data modulations and each of the codings, selecting at the controlling station each individual one of the hopping frequencies and each individual one of the data modulations and each individual one of the codings for each individual one of the selected hopping frequencies to provide an optimal ratio of signal to noise and interference for each individual one of the selected hopping frequencies, and transmitting, from the controlling station to the controlled station, the information relating to each individual one of the selected hopping frequencies and the individual one of the data modulations and the individual one of the codings selected for each individual one of the selected hopping frequencies.

40. A method as set forth in claim 39 wherein the controlled station sends data to the controlling station at each individual one of the selected hopping frequencies with the individual one of the data modulations and the individual one of the codings providing optimal ratios of signal to noise and interference for each individual one of the selected hopping frequencies.

41. A method as set forth in claim 40 wherein the controlling station periodically selects each individual one of the hopping frequencies, and each individual one of the data modulations and each individual one of the codings, for each individual one of the selected hopping frequencies to provide an optimal ratio of signal to noise and interference and wherein the controlling station transmits to the controlled station the information relating to each individual one of the periodically selected hopping frequencies, and the individual one of the data modulations and the individual one of the codings, for each individual one of the selected hopping frequencies providing an optimal ratio of signal to noise and interference for the individual one of the selected hopping frequencies, and wherein the controlled station thereafter transmits to the controlling station the data at each individual one of the periodically selected hopping frequencies, and the individual one of the data modulations and the individual one of the codings, periodically selected for the individual one of the periodically selected hopping frequencies.

* * * * *